United States Patent
Smith

(10) Patent No.: US 9,894,843 B2
(45) Date of Patent: Feb. 20, 2018

(54) CONTINUOUS HARVESTER WITH CROP SUPPLY CHAMBER

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 14/996,177

(22) Filed: Jan. 14, 2016

(65) Prior Publication Data

US 2017/0202150 A1    Jul. 20, 2017

(51) Int. Cl.
| A01F 15/10 | (2006.01) |
| A01F 15/18 | (2006.01) |
| A01F 15/07 | (2006.01) |
| A01F 15/08 | (2006.01) |
| B30B 9/30 | (2006.01) |

(52) U.S. Cl.
CPC ...... *A01F 15/0705* (2013.01); *A01F 15/0715* (2013.01); *A01F 15/0875* (2013.01); *A01F 15/106* (2013.01); *A01F 15/18* (2013.01); *B30B 9/301* (2013.01); *A01F 2015/078* (2013.01)

(58) Field of Classification Search
CPC ............ A01F 15/0705; B30B 9/301
USPC .................. 56/341; 100/40, 88, 89
See application file for complete search history.

(56) References Cited

U.S. PATENT DOCUMENTS

| 4,514,969 A | 5/1985 | Moosbruker et al. |
| 4,542,617 A * | 9/1985 | Sonntag ................ A01F 15/106 100/88 |
| 4,580,398 A * | 4/1986 | Bruer .................. A01F 15/0705 100/5 |
| 4,656,812 A | 4/1987 | Busse et al. |
| 4,686,812 A | 8/1987 | Bruer et al. |
| 4,914,900 A * | 4/1990 | Viaud ................. A01F 15/0705 100/88 |
| 5,115,734 A * | 5/1992 | Quartaert ............ A01F 15/0705 100/5 |
| 5,136,831 A | 8/1992 | Fell et al. |
| 6,295,797 B1 | 10/2001 | Naaktgeboren et al. |
| 6,644,006 B1 | 11/2003 | Merritt et al. |
| 6,688,092 B2 | 2/2004 | Anstey et al. |
| 6,877,304 B1 | 4/2005 | Smith et al. |
| 7,584,594 B2 | 9/2009 | Viaud |
| 8,291,687 B2 | 10/2012 | Herron et al. |
| 8,413,414 B2 | 4/2013 | Herron et al. |

(Continued)

FOREIGN PATENT DOCUMENTS

| DE | 3631159 A1 | 3/1988 |
| EP | 2196082 A1 | 6/2010 |
| GB | 2003716 | 3/1979 |

*Primary Examiner* — John G Weiss
(74) *Attorney, Agent, or Firm* — Patrick M. Sheldrake

(57) ABSTRACT

The disclosure relates to a harvester capable of continuous bailing of crop material, particularly to a harvester comprising a crop supply chamber positioned in front of a bale chamber, capable of storing crop material during the wrapping of a bale of harvested crop material, and a deflection system, capable of allowing crop material to enter into the bale chamber. The crop supply chamber further comprises a supply inlet at the bottom of the crop supply chamber and a movable control plate positioned within the crop supply chamber.

24 Claims, 6 Drawing Sheets

(56) References Cited

U.S. PATENT DOCUMENTS

| | | | |
|---|---|---|---|
| 8,627,765 B2 * | 1/2014 | Reijersen Van Buuren | A01F 15/0705 100/40 |
| 8,707,865 B2 * | 4/2014 | Oakes | A01F 15/0705 100/35 |
| 8,733,241 B2 | 5/2014 | Roberge | |
| 8,910,460 B2 | 12/2014 | Horstmann | |
| 9,084,394 B2 | 7/2015 | Roberge | |
| 9,253,948 B2 * | 2/2016 | Olander | A01F 15/106 |
| 2012/0297992 A1 | 11/2012 | Oakes | |
| 2013/0305683 A1 | 11/2013 | Ziembicki | |
| 2014/0165856 A1 * | 6/2014 | Varley | A01F 15/0705 100/40 |
| 2015/0373915 A1 | 12/2015 | Roberge | |
| 2015/0373916 A1 | 12/2015 | Roberge | |

\* cited by examiner

Prior Art

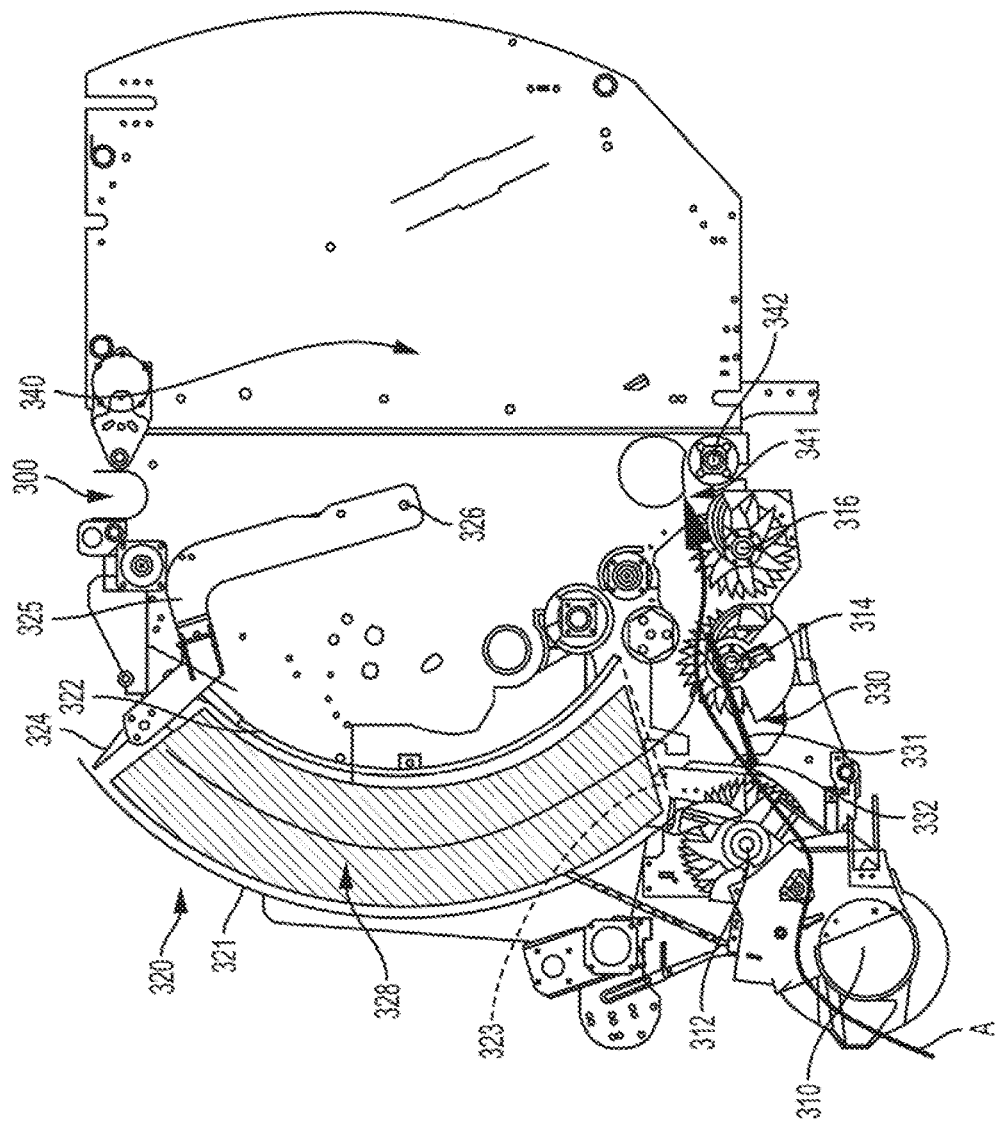

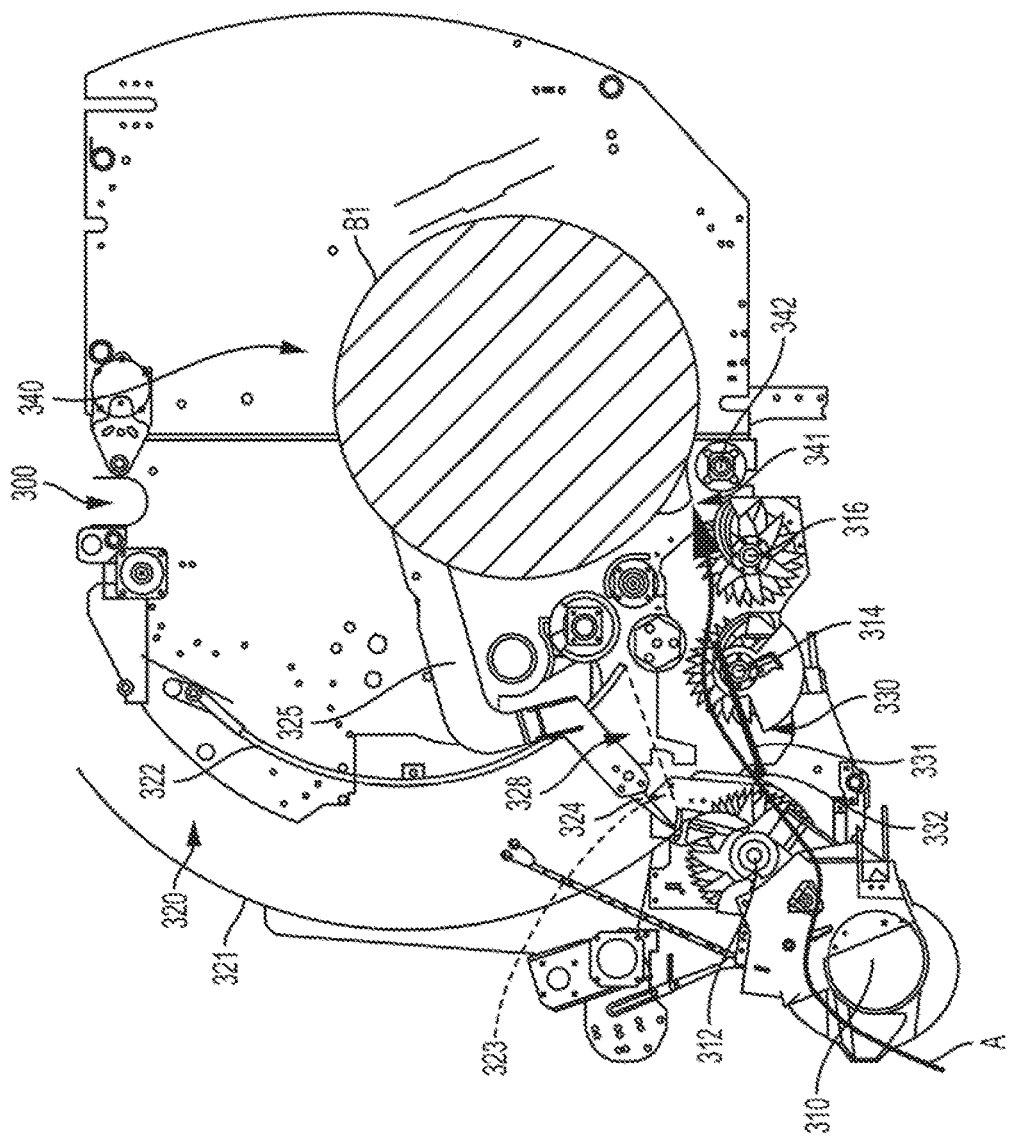

CONTINUOUS HARVESTER WITH CROP SUPPLY CHAMBER

TECHNOLOGY FIELD

The present invention relates generally to a harvester capable of continuous bailing of crop material, particularly to a harvester comprising a crop supply chamber capable of holding crop material during the wrapping of a bale of harvested crop material.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material in to the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged. The tailgate is then closed and the cycle repeated as necessary and desired to manage the field of cut crop material.

Conventional balers require a relatively long period of downtime, typically between 10 and 15 seconds, to open the tailgate of the baler and eject the wrapped bale. The downtime required reduced the overall efficiency of the harvesting system. Modified balers have been designed to allow for continuous harvesting, where crop can either be stored in a separate crop supply chamber (or "pre-chamber") or wrapped into a new bale, simultaneous with the wrapping and ejecting of a fully formed bale in the main bale chamber.

Types of pre-chambers have been previously described, for example in U.S. Pat. Nos. 4,514,969 and 4,656,812, which use pre-chambers located in front of a bale chambers to store crop material. Typical of many balers/pre-chamber designs, there is difficulty in both allowing or directing crop material to enter the pre-chamber due to difficult flow angles or several moving parts, and having cropping material exit the pre-chamber in a controlled manner that consistently produces bales with uniform shape and density.

The instant application provides a continuous harvester with a crop supply chamber that is capable of storing crop material during the wrapping and ejecting of a bale, ejecting stored crop material during the creation of a new bale, and combining the stored crop material with new crop material to consistently create high quality bales of uniform shape and density.

SUMMARY

The disclosure relates to a harvester comprising: a pair of oppositely facing sidewalls; a pickup assembly; a bale chamber, positioned between the pair of sidewalls, comprising an crop inlet at the front end of the bale chamber, and an outlet at the rear end of the bale chamber; a crop supply chamber, positioned between the pair of sidewalls and in front of the bale chamber, comprising a supply inlet at the bottom of the crop supply chamber and a movable control plate positioned within the crop supply chamber; and a deflection system, positioned between the front of the crop inlet of the bale chamber and the pickup assembly, further positioned below the supply inlet of the crop supply chamber; wherein the deflection system comprises at least one deflection panel, operably connected to and capable of rotation around a pivot point positioned between the pair of sidewalls of the harvester, and a deflection hydraulic actuator, operably connected to the controller and capable of rotating the deflection panel around the pivot point.

In some embodiments, the deflection system further comprises a first and a second operable condition; wherein, in the first operable condition, the at least one deflection panel does not occlude the entry point of the bale chamber; and wherein, in the second operable condition, the at least one deflection panel does occlude the entry point of the bale chamber.

In some embodiments, the crop supply chamber further comprises a front wall, a rear wall, and a storage volume; wherein the storage volume is defined by the space between the front wall, the rear wall, the pair of oppositely facing sidewalls, the control plate and the supply inlet.

In some embodiments, the height of the crop supply chamber is substantially higher that its width, and at least a portion of the crop supply chamber is arced and adjacent to or substantially adjacent to the bale chamber; and wherein the control plate covers at least one horizontal plane of the crop supply chamber and its edges contact or are proximate to each of the front wall, rear wall, and sidewalls, such that the control plate defines a vertical or substantially vertical height of the storage volume past which stored crop material cannot be stored.

In some embodiments, the crop supply chamber further comprises: a control arm pivot point, positioned between or on the pair of sidewalls; at least one control arm, operably connected to the control plate at one end and to the control arm pivot point at the other end; and at least one control arm hydraulic actuator operably connected to the at least one control arm; wherein the control arm pivot point is positioned rearward of the storage volume; and wherein the control plate and control arms are capable of movement in an radial direction around the pivot point, by extension and retraction of the at least one control arm hydraulic actuator.

In some embodiments, the movement of the control plate and control arms by the at least one control arm hydraulic actuator is capable of altering the shape of the storage volume, such that, when the control plate moves in a radially upward direction, the storage volume increases in size, and when the control plate moves in a radially downward direction, the storage volume decreases in size.

In some embodiments, the crop supply chamber further comprises a first operable position, wherein, in the first operable position, the control plate is positioned at or proximate to the bottom of the front and rear walls, such that the control plate occludes the supply inlet of the crop supply chamber and the storage volume is at or about zero.

In some embodiments, the crop supply chamber further comprises a second operable position, wherein, in the second operable position, the control plate is positioned at or proximate to the top of the front and rear walls, such that the control plate does not occlude the supply inlet of the crop supply chamber and the storage volume is at or about at a maximum volume.

In some embodiments, the crop supply chamber further comprises a first and a second operable positions; wherein, in the first operable position, the control plate is positioned at or proximately to the bottom of the front and rear walls, such that the control plate occludes the supply inlet of the crop supply chamber and the storage volume is at or approximately zero; and wherein, in the second operable position, the control plate is positioned at or proximate to the top of the front and rear walls, such that the control plate does not occlude the supply inlet of the crop supply chamber and the storage volume is at or about at a maximum size.

In some embodiments, the crop supply chamber further comprises a plurality of selectively operable positions in which the control plate may transition from a first height within the crop supply chamber to a second height within the crop supply chamber.

In some embodiments, the hydraulic actuator is mechanically linked to the at least one control arm at or proximate to the pivot point, such that movement of the hydraulic actuator controls radial movement of the at least one control arm allowing transition between the plurality of operable positions.

In some embodiments, transition between the plurality of operable positions of the crop supply chamber are synchronous or substantially synchronous to the movement of the control arm and the control plate, such that, when the crop supply chamber is in a first operable position, the control arm and control plate do not transition between at least two heights within the crop supply chamber; and, when the crop supply chamber transitions to one or a plurality of operable positions, the control arm and control plate move between at least two heights within the crop supply chamber.

In some embodiments, transition between the plurality of operable positions of the crop supply chamber are synchronous or substantially synchronous to transitions between the operable conditions of the deflection system, such that, when the crop supply chamber is in a first operable position, the deflection system is in the first operable condition; and, when the crop supply chamber transitions to one or a plurality of operable positions, the deflection system is in its second operable mode.

In some embodiments, the harvester further comprises a series operable modes wherein, in a first operable mode, crop material is directed from the pickup assembly into the storage volume of the crop supply chamber when the deflection system is in the second operable condition and the crop supply chamber transitions from the first operable position to one or a plurality of operable positions; and wherein, in a second operable mode, crop material is displaced from the storage volume and directed into the bale chamber when the deflection system is in the first operable condition and the crop supply chamber transitions from the second operable position to the one or a plurality of operable positions.

In some embodiments, the harvester further comprises: a serpentine system arranged for the bale chamber, comprising a plurality of baling belt rollers in operable contact with one or more baling belts, the plurality of baling belts rollers comprising at least two lower baling belt rollers positioned on either side of the crop inlet of the bale chamber; a tailgate, capable of occluding the outlet of the bale chamber in a closed position and exposing the outlet of the bale chamber in one or more open positions; a net wrap mechanism, positioned at the rear of the harvester, capable of wrapping a formed bale in the bale chamber prior to ejection of said bale from the harvester; a cutting rotor, position between the pickup assembly and the deflection system, capable of cutting crop material prior to baling; at least one feeding rotor, capable of assisting the entry of crop material into the bale chamber; control arm sensor, capable of determining the position of the control arm and control plate in the crop supply chamber; a bale diameter sensor, capable of determining the size of a bale in the bale chamber; and a controller, operably connected to the bale diameter sensor, the control arm sensor, the at least one control arm hydraulic actuator, and the crop gating system.

In some embodiments, the harvester further comprises at least a first, second, and third operable modes, wherein in the first operable mode, crop material is collected by the pickup assembly, passed through the cutting rotor, and directed into the bale chamber by the deflection system; in the second operable mode, the crop supply chamber transitions from a first operable position to a second operable position; wherein crop material is collected by the pickup assembly, passed through the cutting rotor, and directed into the crop supply chamber; and in third operable mode, crop material is collected by the pickup assembly, passed through the cutting rotor, directed into the bale chamber by the deflection system, and, simultaneously or substantially simultaneously, stored crop material in the storage volume exits the crop supply chamber and is also directed into the bale chamber by the deflection system.

In some embodiments, the harvester transitions from the first or the third operable mode to the second operable mode when the bale diameter sensor detects that a bale in the bale chamber has reached a predetermined size and/or when the net wrap mechanism begins to wrap a bale in the bale chamber. In some embodiments, the harvester transitions from the second operable mode to the third operable mode when the bale diameter sensor detects that no bale exists in the bale chamber and/or when the tailgate is returning or has returned to a closed position.

In some embodiments, the harvester further comprises an operator interface, capable of receiving information from and electronically connected to the controller, and displaying the information to an operator, wherein the information comprises one or more of the following: operable condition of the harvester, position of the control plate in the crop supply chamber, and direction of crop flow into or out of the crop supply chamber.

In some embodiments, the at least one feeding rotor is positioned between the deflection system and crop inlet of the bale chamber. In some embodiments, at least a second feeding rotor is positioned between the supply inlet and the bale chamber, and above the deflection system.

The present disclosure relates to a method of harvesting crop material comprising: (a) collecting crop material by a pickup assembly; (b) directing crop material into a crop supply chamber by a conveyor belt or deflection system; (c) detecting when crop material has formed a bale of predetermined size; (d) wrapping and ejecting the bale while simultaneously directing entry of crop material into the crop supply chamber; (e) detecting when the bale of crop material has been ejected from the bale chamber; (f) ejecting crop material from the crop supply chamber by a control plate while continuing to collect new crop material by the pickup assembly; (g) directing entry of crop material from both the crop supply chamber and the pickup assembly into the bale chamber; and, optionally, (h) repeating steps (c) to (g) until harvesting a predetermined number of bales is complete.

The present disclosure also relates to a method of harvesting crop material comprising: (a) collecting crop material by a pickup assembly; (b) preventing entry of crop material into a crop supply chamber by a control plate and allowing entry of crop material into a bale chamber by a deflection system; (c) detecting when crop material has formed a bale of predetermined size; (d) wrapping and ejecting the bale while simultaneously allowing entry of crop material into the crop supply chamber by a control plate; (e) detecting when the bale of crop material has been ejected from the bale chamber; (f) ejecting crop material from the crop supply chamber by a control plate while continuing to collect new crop material by the pickup assembly; (g) allowing entry of crop material from both the crop supply chamber and the pickup assembly into the bale chamber by a deflection system; and, optionally, (h) repeating steps (c) to (g) until harvesting is complete.

In some embodiments, the crop gating system comprises a deflection panel capable of preventing or assisting entry of crop material into the bale chamber. In some embodiments the method further comprises providing information to an operator via an operator interface about one or more of the following: position of the control plate in the crop supply chamber, position of the rear wall in the crop supply chamber, and direction of crop flow into or out of the crop supply chamber.

BRIEF DESCRIPTION OF THE DRAWINGS

FIGS. 3A-3D depict various stages of a baling cycle in a harvester with a crop supply chamber and a deflection system.

DETAILED DESCRIPTION OF THE DISCLOSURE

Figure 1:
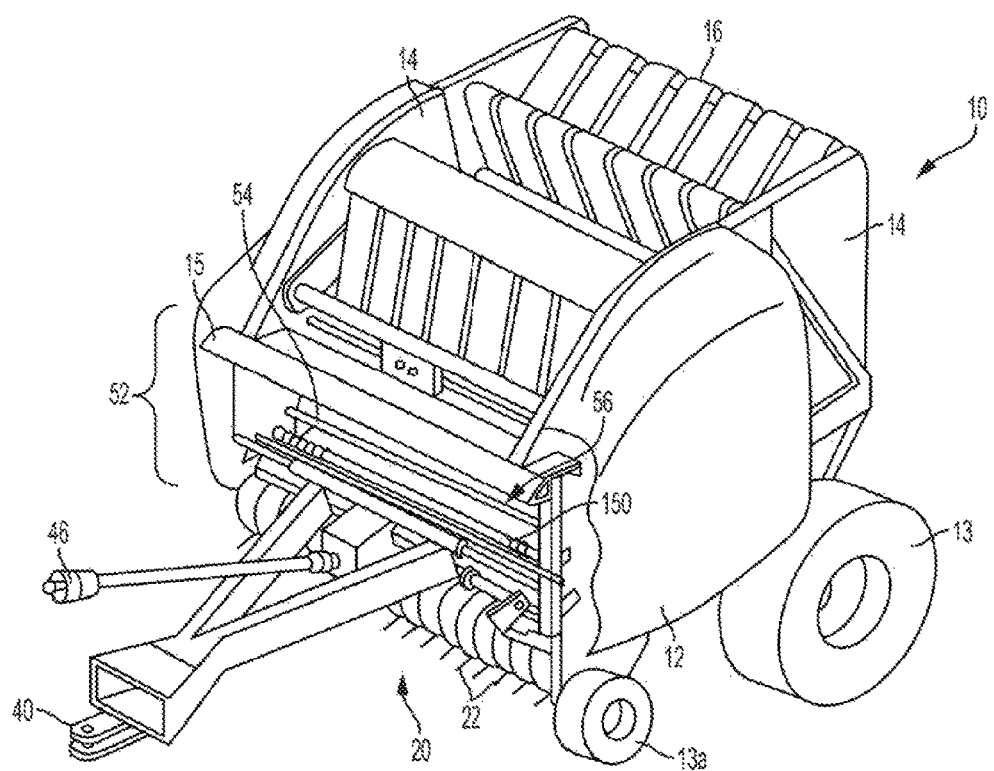
FIG. 1 depicts a static image of a conventional baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on the bale as it grows.

The term "wrapping mechanism" as used herein is defined as a mechanical device or assembly that uses wrapping material to wrap a formed bale.

The term "wrapping material" as used herein is defined as a net, mesh, twine, plastic film, or other material that is used for the wrapping of a bale in order to maintain the shape and density of said bale and optionally protect it from weather or other external conditions.

The term "crop supply chamber" as used herein is defined as an any space within the harvester that is capable of storing crop material. In some embodiments, the crop supply chamber is capable of storing crop material when the flow of crop material is directed into the crop supply chamber. In some embodiments, the crop supply chamber is capable of storing crop material when a bale chamber is not capable of receiving crop material, for example, because the bale chamber contains a fully formed bale. In some embodiments, the crop supply chamber is positioned in front of a bale chamber. In some embodiments, the crop supply chamber is defined by a front wall, a rear wall, and a pair of sidewalls. In some embodiments, the crop supply chamber comprises a front wall, a rear wall, a pair of sidewalls, and a storage volume. In some embodiments, the crop supply chamber comprises a front wall, a rear wall, a pair of sidewalls, a storage volume and a control plate. In some embodiments, the crop supply chamber is curved.

The term "storage volume" as used herein is defined as any space within a crop supply chamber that is capable of storing crop material. In some embodiments, the storage volume is defined by the space between the front wall of the crop supply chamber, the rear wall of the crop supply chamber, the pair of oppositely facing sidewalls of the harvester, the control plate, and the inlet of the crop supply chamber. In some embodiments, the crop supply chamber is capable of both storing crop material in the storage volume and releasing stored crop material from the storage volume. In some embodiments, the size of the storage volume can change. In some embodiments, the size of the storage volume increases as crop material enters the storage volume. In some embodiments, the size of the storage volume decreases as crop material exits the storage volume. In some embodiments, the increasing size of the storage volume facilitates the entrance of crop material in the storage volume. In some embodiments, the decreasing size of the storage volume facilitates the exiting of crop material from the storage volume. In some embodiments, the storage volume is curved.

The term "control plate" as used herein is defined as an element in the crop supply chamber that defines the upper boundary of the storage volume. In some embodiments, the control plate is or comprises one or more of the following: a solid plate, a series of bars, and mesh or wire. In some embodiments, the control plate is flat. In some embodiments, the control plate is curved. In some embodiments, the control plate is capable of movement within the crop supply chamber. In some embodiments, the control plate prevents crop material from moving beyond the top of the storage volume. In some embodiments, the control plate pushes crop material out of the storage volume. In some embodiments, the control plate is operably connected to a mechanical arm which facilitates the movement of the control arm in the crop supply chamber. In some embodiments, the control arm is capable of moving from the bottom of the crop supply chamber to the top of the crop supply chamber. In some embodiments, the control arm is capable of occluding the opening on the crop supply chamber.

The term "crop gating system" as used herein is defined as a system in a harvester that is capable of altering the direction of the crop material once said crop material is present in the harvester. In some embodiments, the crop gating system is capable of allowing crop material to enter a bale chamber. In some embodiments, the crop gating system is capable of preventing crop material from entering the bale chamber. In some embodiments, the crop gating system is capable of allowing crop material to enter into a crop supply chamber. In some embodiments, the crop gating system is capable of preventing crop material from entering the crop supply chamber.

In some embodiments, the crop gating system comprises a deflection panel. In some embodiments, the deflection panel is capable of rotation around a pivot point. In some embodiments, the deflection panel is operably connected to a hydraulic actuator capable of rotating the deflection panel around the pivot point. In some embodiments, the deflection panel does not occlude the entry point of the bale chamber in a first operable mode of the crop gating system. In some embodiments, the deflection panel does occlude the entry point of the bale chamber in a second operable mode of the crop gating system. In some embodiments, the crop material is directed from a pickup assembly and into a crop supply chamber by the deflection panel.

In some embodiments, the crop gating system comprises a front roller, a rear roller, at least one conveyor belt, and a motor operably connected to the controller and capable of endlessly rotating the conveyor belt around the front and rear rollers of the crop gating system. In some embodiments, the at least one conveyor belt rotates around the front and rear rollers such that, at any point in time, the top portion of the conveyor belt moves towards the entry point of the bale chamber in a first operable mode of the crop gating system; and wherein the at least one conveyor belt does not rotate around the front and rear rollers in a second operable mode of the crop gating system. In some embodiments, the entry of the crop material into the bale chamber is facilitated by the crop gating system when the conveyor belt is rotating. In some embodiments, the entry of the crop material into the crop supply chamber is facilitated by the crop gating system when the conveyor belt is not rotating. In some embodiments, the conveyor belt comprises a series slats connected by chains.

In some embodiments, the crop gating system comprises at least one auger, and a motor operably connected the at least one auger and capable of rotating the at least one auger around an axis. In some embodiments, the rotation of the at least one auger is capable of moving crop material towards the entry point of a bale chamber. In some embodiments, the entry of the crop material into the bale chamber is facilitated by the crop gating system when the at least one auger is rotating. In some embodiments, the entry of the crop material into the crop supply chamber is facilitated by the crop gating system when the at least one auger is not rotating.

In some embodiments, the crop gating system comprises at least one rotor, and at least one motor operably connected to at least one rotor and capable of rotating the at least one rotor around an axis. In some embodiments, the crop gating system comprises a series of rotors, each rotor individually connected to a motor capable of rotating the rotor around its axis. In some embodiments, the rotation of the at least one rotor is capable of moving crop material towards the entry point of a bale chamber. In some embodiments, the entry of the crop material into the bale chamber is facilitated by the crop gating system when the at least one rotor is rotating. In some embodiments, the entry of the crop material into the crop supply chamber is facilitated by the crop gating system when the at least one rotor is not rotating.

The term "information" as used herein is defined as data values attributed to parameters. In some embodiments, information is digital and/or analog information. In some embodiments, information is the current rotation angle of a bottom floor assembly. In some embodiments, information is the current rotation angle of a rotation sensor. In some embodiments, information is warning information, such as warning information sent to a display or a type of operator interface. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system comprising a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, I/O devices may be couple to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The term "real-time" and the phrase "in real-time" as used herein are defined as a way of describing a process, event, or action that occurs simultaneously with the process of actively forming a bale in a bale chamber. In some embodiments, various sensors, for example a rotation sensor, continuously sense information about the rotation angle of a bottom floor assembly and transmit that information to a controller in real-time. In some embodiments, an operator may adjust values in an operator interface in real-time by accessing the system electronically and inputting one or a plurality of values.

The term "pre-determined size" as used herein is defined as a value which is determined, set, or calculated before the completion of a bale forming cycle, such that, when a bale forming in a bale chamber reaches the value, an event occurs. For example, if the pre-determined size is a specified bale diameter, a harvester may begin a bale wrapping and ejection cycle when bale sensors determine that the forming bale has reached the specified diameter. In some embodiments, the pre-determined size is determined prior to the start of a bale forming cycle. In some embodiments, the pre-determined size is a parameter of diameter, weight, density, moisture content, or position. In some embodiments, the determination of whether a bale has reached the pre-determined size is within the error range of the sensors and controllers involved in the determination. In some embodiments, the determination of whether a bale has reached the pre-determined size is within ±10% of the pre-determined size value. In some embodiments, an operator determines the pre-determined size values. In some embodiments, a controller or other software program determines the pre-determined size values. In some embodiments, an operator provides the pre-determined size values via an operator interface that is in electronic communication with one or more controllers. In some embodiments, a combination of an operator and a controller or other software program determines the pre-determined size values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 9,084,394, 8,733,241, 8,413,414, 8,291,687, 6,877,304; 6,688,092; 6,644,006 and 6,295,797, 5,136,831 and U.S. patent Ser. No. 14/316,209, and Ser. No. 14/316,162 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism. Cross-reference is made to U.S. Patent Applications covering Invention disclosure nos. 52322 and 52342, both entitled "Continuous Harvester with Crop Supply Chamber", filed on Jan. 14, 2016, contemporaneously with this application, both of which are incorporated herein by reference in their entirety.

The present disclosure relates to a continuous harvester, capable of harvesting crop material even while wrapping and ejecting a fully formed bale from its bale chamber. Crop material harvested while the bale is being wrapping and ejected is directed into a crop supply chamber, located in front of the bale chamber, that temporarily stores the crop material. Once the bale is ejected from the bale chamber and the harvester is ready to begin the formation of a new bale, the crop material stored in the crop supply chamber is gradually added to the newly harvested crop material, and the combined crop supply is used to form a new bale.

In some embodiments, a control plate is present in the crop supply chamber that controls the available space, or storage volume, that crop material can be placed into. The control plate is capable of moving upward and downward in the crop supply chamber to vary the size of the storage volume. When the control plate moves upward, the storage volume increases in size and more crop material can be placed within the crop supply chamber. When the control plate moves downward, the storage volume decreases in size and stored crop material is ejected from the crop supply chamber. The movement of the control plate is controlled by a control arm and hydraulic cylinder, which in turn is controlled by a processing unit or controller. The position and speed of the control plate, and thus the size and the rate of change of the storage volume, is regulated to both contain and store all of the necessary crop material while a bale is being wrapping and ejected, and to gradually but completely eject all of the stored crop material while a new bale is being formed.

In some embodiments, a deflector system is located between the crop supply chamber and the bale chamber that controls the movement of the crop material into the bale chamber. A deflector plate can be raised and lowered, such that when the plate is lowered crop material can pass into the bale chamber, but when the plate is raised crop material is prevented from passing into the bale chamber. In some embodiments, when the deflection panel is raised, crop material is capable of moving into the crop supply chamber.

Referring to the figures, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
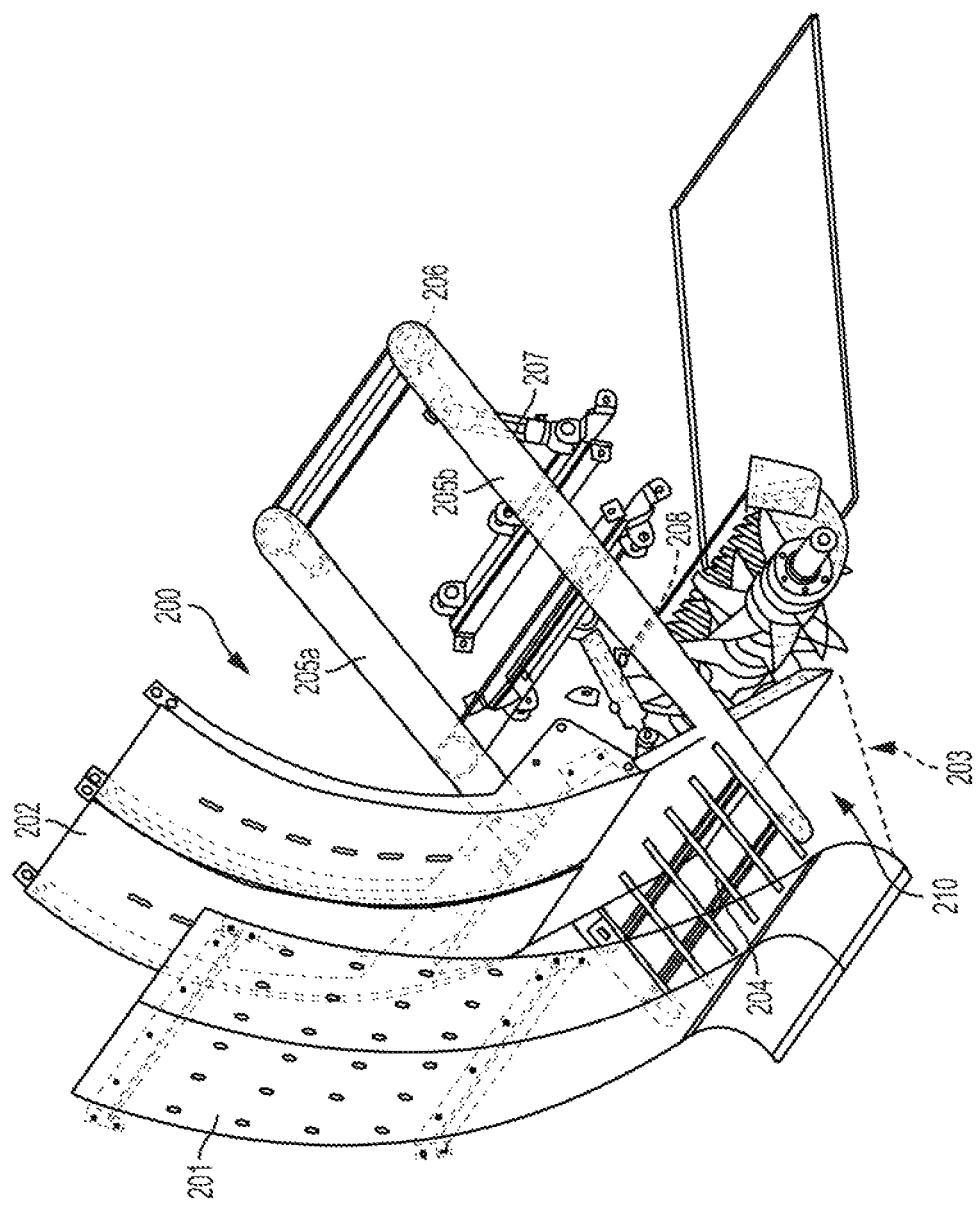
FIG. 2 depicts a three dimensional wireframe of a crop supply chamber with a control arm and associated hydraulic actuators.

FIG. 2 depicts a three dimensional image of an exemplary crop supply chamber, generally labeled 200. The crop supply chamber comprises a front wall 201 and a rear wall 202. The sidewalls of the crop supply chamber have been removed for clarity. The opening at the bottom of the crop supply chamber is the supply inlet, general labeled 203. In between the front wall 201 and the rear wall 202 is the control plate 204, shown here as a connected series of bars. The control plate 204 is attached to a pair of control arms 205a and 205b, which are themselves attached to the sidewalls (not shown) at a pivot point 206. A hydraulic actuator 207, mounted to the sidewalls by a mounting bar 208, is attached to the control arms 205a and 205b. As the hydraulic actuator 207 extends, the controls arms 205a and 205b and the control plate 204 move upward in a radial motion around the pivot point 206.

The volume between the front wall 201, rear wall 202, the sidewalls (not shown), the supply inlet 203, and the control plate 204 is the storage volume, generally labeled 210. As the hydraulic actuator 207 extends, the control plate 204 moves to a higher position in between the front wall 201 and the rear wall 202, thus increasing the size of the storage volume 210. As the hydraulic actuator 207 retracts, the control plate 204 moves to a lower position in between the front wall 201 and the rear wall 202, thus decreasing the size of the storage volume 210. In some embodiments, crop material can be stored in the storage volume 210. In some embodiments, an increasing amount of crop material can be stored in the storage volume 210 as the control plate 204 moves to a higher position and the size of the storage volume 210 increases. In some embodiments, crop material stored in the storage volume 210 can be displaced out of the crop supply chamber 200 as the control plate 204 moves to a lower position and the size of the storage volume 210 decreases.

FIGS. 3A-3D depict the function of the components of an exemplary cross-sectional side-view of a continuous harvester with a crop supply chamber and deflection system. It is understood that the components of the harvester may function in a serial, stepwise, or simultaneous fashion, but that all steps described in FIGS. 3A, 3B, 3C, and 3D illustrate one embodiment of a single cycle of continuous baling for the purposes of the disclosure.

FIGS. 3A-3D depict the continuous harvester, generally labeled 300, comprising a pick-up assembly 310, a cutting rotor 312, a first feeding rotor 314, a second feeding rotor 316, a crop supply chamber 320, a deflection system 330, and a bale chamber 340. The crop supply chamber comprises a front wall 321, a rear wall 322, a supply inlet 323, a control plate 324, a control arm 325, a control arm pivot point 326, a hydraulic actuator (not shown), and a storage volume 328. The deflection system comprises a deflection panel 331, and a deflection panel pivot point 332. The bale chamber 340 comprises a crop inlet 341 and a floor roller 342. The sidewalls of the harvester 300 are not shown for clarity.

Figure 3A:
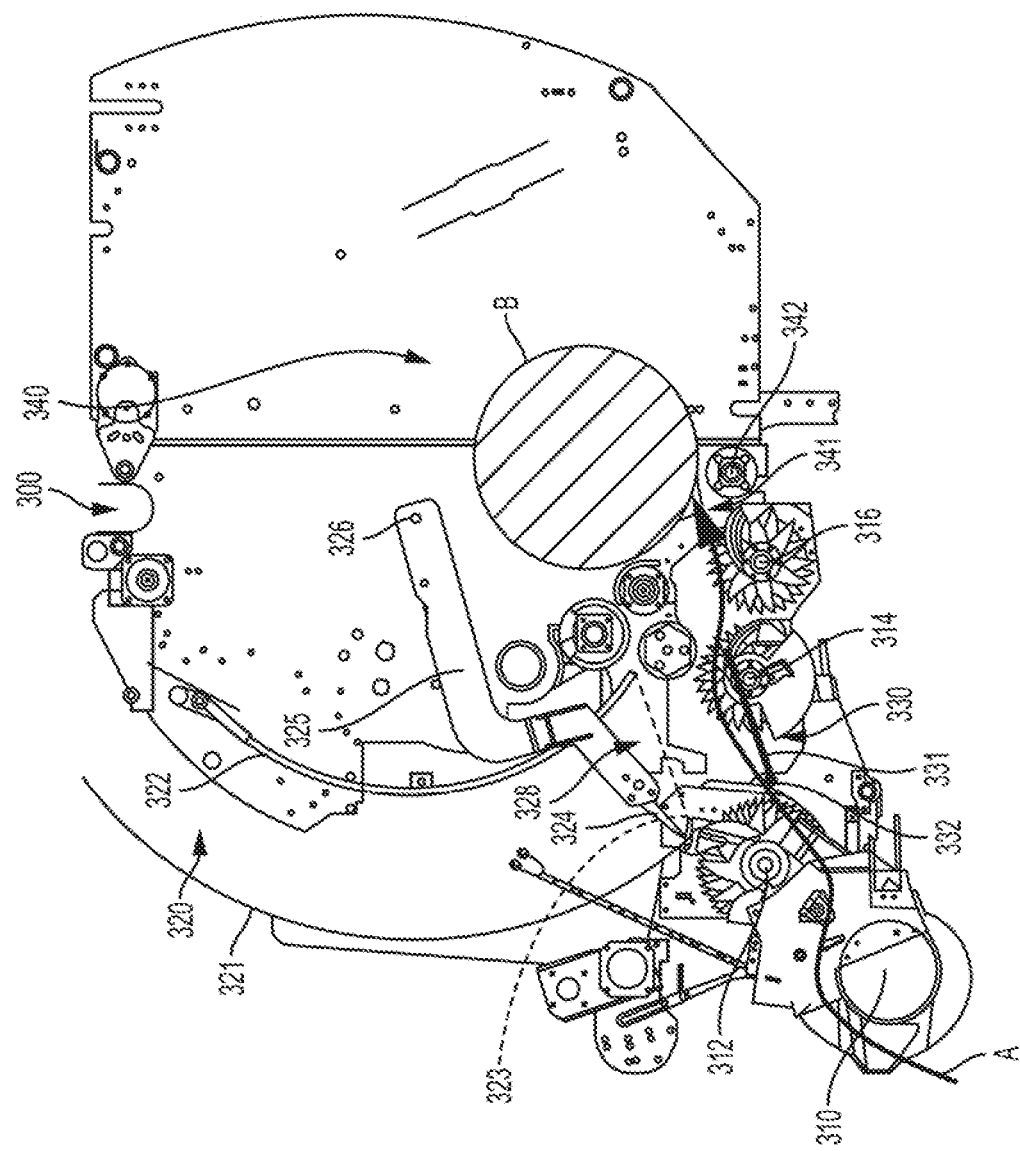

In FIG. 3A, the continuous harvester 300 is at the beginning of a first operational cycle. Crop in the field is usually arranged in a windrow as it is engaged by the harvester 300 being pulled along the windrow by a tractor (not shown). The generalized path of crop material through the harvester 300 is highlighted by arrow A. Crop material is moved off of the ground by the pick-up assembly 310 and fed into a cutting rotor 312, which optionally cuts the crop material before throwing it towards the deflection panel 331. In some embodiments, the crop material is thrown upwards by the cutting rotor 312 towards the supply inlet 323 and control plate 324. In some embodiments, the location of the control plate 324 prevents crop material from entering into the crop supply chamber 320. In some embodiments, the first feeding rotor 314 is rotating towards the bale chamber in FIG. 3A. In some embodiments, the location of the control plate 324 and the rotation of the first feeding rotor 314 cause crop material thrown from the cutting rotor 312 to move closer to the crop inlet 341. The deflection panel 331 is in a lower position, and does not block the movement of the crop material toward the bale chamber 340. As the crop material comes closer to the crop inlet 341, the crop material is thrown through the crop inlet 341 and into the bale chamber 340 by the second feeding rotor 316, which is rotating towards the bale chamber in FIG. 3A. Once in the bale chamber 340, the crop material is formed into a bale B, which grows in diameter and weight as additional crop material is added to the bale chamber 340.

Figure 3B:
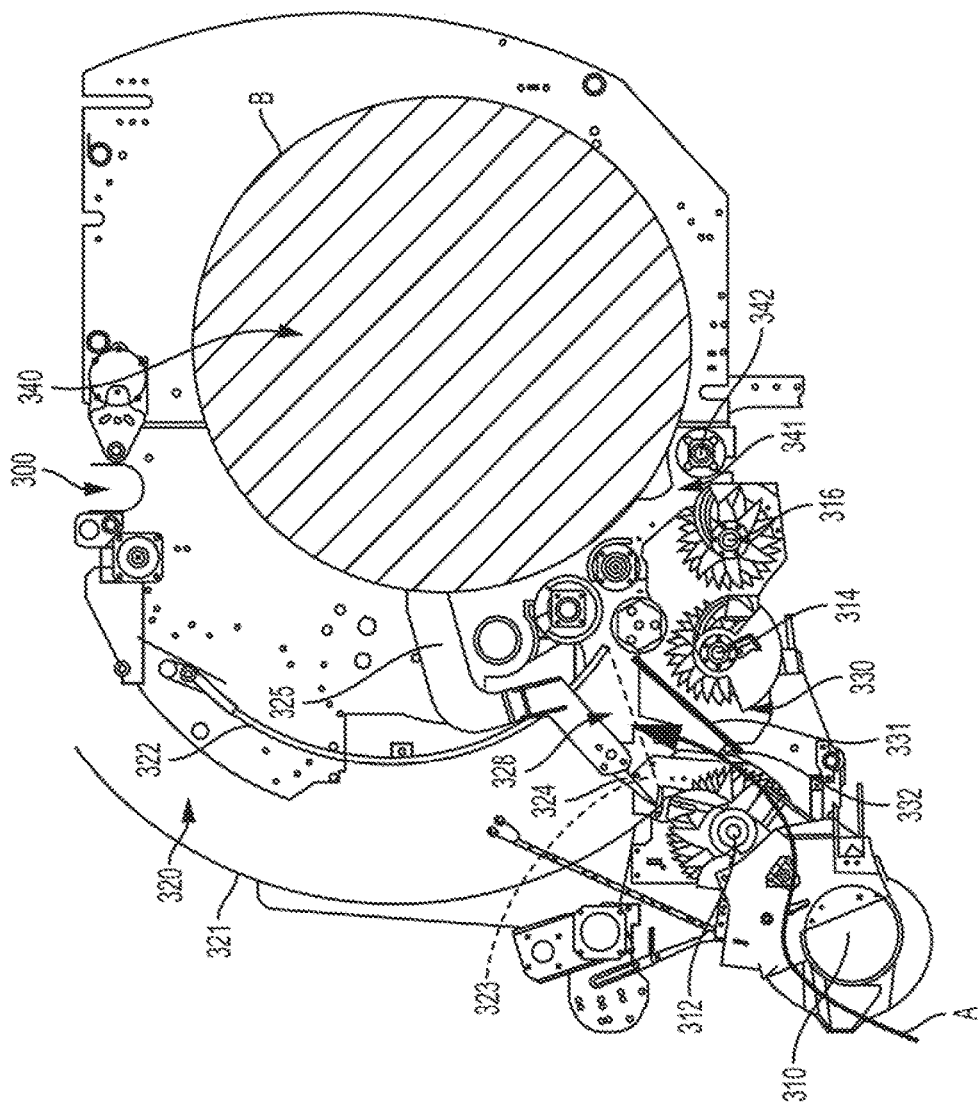

In FIG. 3B, the bale B has reached a pre-determined size in the bale chamber 340. In some embodiments, the pre-determined size is determined by a bale diameter sensor located in or proximate to the bale chamber 340. In some embodiments, the pre-determined size is determined by a bale weight sensor located in or proximate to the bale chamber 340. In conventional harvesting, a baler would now stop processing crop material in order to wrap and eject a completed bale. In FIG. 3B, the exemplary harvester 300 continues to collect crop material by the pick-up assembly 310, while also beginning the wrapping process for bale B. The deflection panel 331 moves to its raised position, while the hydraulic actuator (not shown) extends, causing the control arm 325 and the control plate 324 to begin to move upward. In some embodiments, the first and second feeding rotors 314 and 316 continue their rotations. As the control plate 324 moves upward in the crop supply chamber 320, the storage volume 328 increases in size. Crop material thrown by the cutting rotor 312 now enters the storage volume 328. As the control plate 324 continues to move upward toward its maximum position in the crop supply chamber 320, the storage volume 328 continues to increase in size.

In FIG. 3C, the bale B has been completely ejected from the bale chamber 340, and is ready to begin forming a new bale. The control plate 324 has reached its maximum upward position in the crop supply chamber 320. In some embodiments, the control plate 324 reaches its maximum upward position in the crop supply chamber 320 and the storage volume 328 reaches its maximum size when the bale B has been completely ejected from the bale chamber 340, and the bale chamber 340 is ready to begin forming a new bale. The deflection panel 314 moves back to its lowered position. In some embodiments, the first and second feeding rotors 314 and 316 continue to rotate. The hydraulic actuator (not shown) begins to contract, moving the control arm 325 and the control plate 324 downward. As the control plate 324 moves downward in the crop supply chamber 320, the storage volume 328 decreases in size. Crop material stored in the storage volume 328 begins to be ejected from the crop supply chamber 320. Meanwhile, crop material continues to be collected from the ground by the pick-up assembly 310 and processed by the cutting rotor 312. In some embodiments, crop entering the bale chamber 340 is coming from multiple locations. In some embodiments, crop material from both the storage volume 328 and new crop material from the pick-up assembly 310 are moved into the bale chamber 340 by the first and second feeding rotors 314 and 316.

In FIG. 3D, a new bale B1 is partially formed in the bale chamber 340. The harvester continues to collect new crop material by the pick-up assembly 310, which is processed by the cutting rotor 312, and moved passed the deflection panel 331 and into the bale chamber 340. The control plate 324 has reached or is about to reach its maximum downward position in the crop supply chamber 320. The storage volume 328 has been decreasing in size, and now all or almost all of the stored crop material has been ejected from the storage volume 328. The first and second feeding rotors 314 and 316 are still rotating, moving crop material into the bale chamber 340. In some embodiments, the control plate 324 reaches is maximum downward position in the crop supply chamber 320 and the storage volume 328 reaches its minimum size immediately before or right as the bale B1 reaches the pre-determined size. When the bale B1 has reached the pre-determined size, the process reverts back to stage depicted in FIG. 3B, where the deflection panel 331 moves to its raised position, the control arm 325 and the control plate 324 move upwards, and harvested crop material is thrown into the storage volume 328 as the bale B1 begins to be wrapped and ejected from the harvester.

Throughout the embodiments of the disclosure, the movement of the control plate within the crop supply chamber, and therefore the change of the size of the storage volume, is controlled throughout the harvesting process. In some embodiments, the positions of the control plate and the control arm are controlled throughout the harvesting process. In some embodiments, the speeds of the control plate and the control arm are controlled throughout the harvesting process. In some embodiments, both the positions and the speeds of the control plate and the control arm are controlled throughout the harvesting process. In some embodiments, a control arm sensor is on or proximate to the control arm or the control arm hydraulic actuator, and is capable of determining the position and/or speed of the control arm. The control arm sensor is in electronic communication with an electronic control unit ("ECU"), or other controller. In some embodiments, the controller controls the position and the speed of the control plate and the control arm by controlling the extension and retraction of the control arm hydraulic actuator.

In some embodiments, a controller can obtain one or more of the following parameters from one or more control arm sensors and/or one or more bale diameter sensors:

Instantaneous Bale Diameter ($D_i$)
Full Bale Diameter ($D_f$)
Arm Motion Range (Degrees$_{arm}$)
Instantaneous Arm Position (Degrees$_i$)
Elapsed Time Between Readings (T)

In some embodiments, the controller is capable of calculating one or more parameters to control the movement of the control arm, including but not limited to:

Bale Growth Rate (BGR)=$(D_{i+1}^2-D_i^2)/T$

Time Until Full Bale ($T_m$)=$(D_f^2-D_i^2)$/BGR

Speed of Control Arm ($V_{arm}$)=(Degrees$_{arm}$−Degrees)/$T_{FB}$

In some embodiments, the controller is in operable communication with an operator interface. The controller can display information pertaining to one or more parameters to provide an operator with information regarding one or more of the following: operable condition of the harvester, position of the control plate in the crop supply chamber, and direction of crop flow into or out of the crop supply chamber. In some embodiments, the operator interface is located within or on a tractor associated with the continuous harvester.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester comprising:
a pair of oppositely facing sidewalls;
a pickup assembly;
a bale chamber, positioned between the pair of sidewalls, comprising an crop inlet at the front end of the bale chamber, and an outlet at the rear end of the bale chamber;
a crop supply chamber, positioned in front of the bale chamber, comprising a supply inlet at the bottom of the crop supply chamber and a movable control plate positioned for movement within the crop supply chamber; and
a deflection system, positioned between the front of the crop inlet of the bale chamber and the pickup assembly, further positioned below the supply inlet of the crop supply chamber; wherein the deflection system comprises at least one deflection panel, operably connected to and capable of rotation around a pivot point, and a deflection actuator, operably connected to a controller and capable of rotating the deflection panel around the pivot point.

2. The harvester of claim 1, wherein the deflection system further comprises a first and a second operable condition;
wherein, in the first operable condition, the at least one deflection panel does not occlude the entry point of the bale chamber; and
wherein, in the second operable condition, the at least one deflection panel does occlude the entry point of the bale chamber.

3. The harvester of claim 1, wherein the crop supply chamber further comprises a front wall, a rear wall, and a storage volume; wherein the storage volume is defined by the space between the front wall, the rear wall, the pair of oppositely facing sidewalls, the control plate and the supply inlet.

4. The harvester of claim 3, wherein the height of the crop supply chamber is substantially higher that its width, and at least a portion of the crop supply chamber is arced and adjacent to or substantially adjacent to the bale chamber; and wherein the control plate covers at least one horizontal plane of the crop supply chamber and its edges contact or are proximate to each of the front wall, rear wall, and sidewalls, such that the control plate defines a vertical or substantially vertical height of the storage volume past which stored crop material cannot be stored.

5. The harvester of claim 1, wherein the crop supply chamber further comprises:
a control arm pivot point, positioned between or on the pair of sidewalls;
at least one control arm, operably connected to the control plate at one end and to the control arm pivot point at the other end; and
at least one control arm actuator operably connected to the at least one control arm;
wherein the control arm pivot point is positioned rearward of the storage volume; and wherein the control plate and control arms are capable of movement in an radial direction around the pivot point, by extension and retraction of the at least one control arm actuator.

6. The harvester of claim 5, wherein the movement of the control plate and control arms by the at least one control arm actuator is capable of altering the shape of the storage volume, such that, when the control plate moves in a radially upward direction, the storage volume increases in size, and when the control plate moves in a radially downward direction, the storage volume decreases in size.

7. The harvester of claim 6, wherein the crop supply chamber further comprises a first operable position, wherein, in the first operable position, the control plate is positioned at or proximate to the bottom of the front and rear walls, such that the control plate occludes the supply inlet of the crop supply chamber and the storage volume is at or about zero.

8. The harvester of claim 6, wherein the crop supply chamber further comprises a second operable position, wherein, in the second operable position, the control plate is positioned at or proximate to the top of the front and rear walls, such that the control plate does not occlude the supply inlet of the crop supply chamber and the storage volume is at or about at a maximum volume.

9. The harvester of claim 6, wherein the crop supply chamber further comprises a first and a second operable positions;
wherein, in the first operable position, the control plate is positioned at or proximately to the bottom of the front and rear walls, such that the control plate occludes the supply inlet of the crop supply chamber and the storage volume is at or approximately zero; and
wherein, in the second operable position, the control plate is positioned at or proximate to the top of the front and rear walls, such that the control plate does not occlude the supply inlet of the crop supply chamber and the storage volume is at or about at a maximum size.

10. The harvester of claim 6, wherein the crop supply chamber further comprises a plurality of selectively operable positions in which the control plate may transition from a first height within the crop supply chamber to a second height within the crop supply chamber.

11. The harvester of claim 10, wherein the at least one control arm actuator is mechanically linked to the at least one control arm at or proximate to the pivot point, such that movement of the at least one control arm actuator controls radial movement of the at least one control arm allowing transition between the plurality of operable positions.

12. The harvester of claim 10, wherein transition between the plurality of operable positions of the crop supply chamber are synchronous or substantially synchronous to the movement of the control arm and the control plate, such that, when the crop supply chamber is in a first operable position, the control arm and control plate do not transition between at least two heights within the crop supply chamber; and, when the crop supply chamber transitions to one or a plurality of operable positions, the control arm and control plate move between at least two heights within the crop supply chamber.

13. The harvester of claim 12, wherein transition between the plurality of operable positions of the crop supply chamber are synchronous or substantially synchronous to transitions between the operable conditions of the deflection system, such that, when the crop supply chamber is in a first operable position, the deflection system is in the first operable condition; and, when the crop supply chamber transitions to one or a plurality of operable positions, the deflection system is in its second operable mode.

14. The harvester of claim 9, further comprising a series operable modes wherein, in a first operable mode, crop material is directed from the pickup assembly into the storage volume of the crop supply chamber when the deflection system is in the second operable condition and the crop supply chamber transitions from the first operable position to one or a plurality of operable positions; and
wherein, in a second operable mode, crop material is displaced from the storage volume and directed into the bale chamber when the deflection system is in the first operable condition and the crop supply chamber transitions from the second operable position to the one or a plurality of operable positions.

15. The harvester of claim 1, further comprising:
a serpentine system arranged for the bale chamber, comprising a plurality of baling belt rollers in operable contact with one or more baling belts, the plurality of baling belts rollers comprising at least two lower baling belt rollers positioned on either side of the crop inlet of the bale chamber;
a tailgate, capable of occluding the outlet of the bale chamber in a closed position and exposing the outlet of the bale chamber in one or more open positions;
a cutting rotor, position between the pickup assembly and the deflection system, capable of cutting crop material prior to baling;
at least one feeding rotor, capable of assisting the entry of crop material into the bale chamber;
a control arm sensor, capable of determining the position of the control arm and control plate in the crop supply chamber;
and
the controller, operably connected to the control arm sensor, the at least one control arm actuator, and a crop gating system.

16. The harvester of claim 15, further comprising at least a first, second, and third operable modes, wherein
in the first operable mode, crop material is collected by the pickup assembly, passed through the cutting rotor, and directed into the bale chamber by the deflection system;
in the second operable mode, the crop supply chamber transitions from a first operable position to a second operable position; wherein crop material is collected by the pickup assembly, passed through the cutting rotor, and directed into the crop supply chamber; and in third operable mode, crop material is collected by the pickup assembly, passed through the cutting rotor, directed into the bale chamber by the deflection system, and, simultaneously or substantially simultaneously, stored crop material in the storage volume exits the crop supply chamber and is also directed into the bale chamber by the deflection system.

17. The harvester of claim 16, wherein the harvester transitions from the first or the third operable mode to the second operable mode when a bale in the bale chamber has reached a predetermined size and/or when the net wrap mechanism begins to wrap a bale in the bale chamber.

18. The harvester of claim 16, wherein the harvester transitions from the second operable mode to the third operable mode when no bale exists in the bale chamber and/or when the tailgate is returning or has returned to a closed position.

19. The harvester of claim 1 further comprising an operator interface, capable of receiving information from and electronically connected to the controller, and displaying the information to an operator, wherein the information comprises one or more of the following: operable condition of the harvester, position of the control plate in the crop supply chamber, and direction of crop flow into or out of the crop supply chamber.

20. The harvester of claim 15, wherein the at least one feeding rotor is positioned between the deflection system and crop inlet of the bale chamber.

21. The harvester of claim 15, wherein at least a second feeding rotor is positioned between in supply inlet and the bale chamber, and above the deflection system.

22. A method of harvesting crop material in a bale chamber, the method comprising:
(a) collecting crop material by a pickup assembly;
(b) preventing entry of crop material into a crop supply chamber by a control plate and allowing entry of crop material into the bale chamber by a deflection system, wherein the crop supply chamber is positioned in front of the bale chamber, the control plate is positioned for movement within the crop supply chamber and the deflection system comprises at least one deflector operably connected to and capable of rotation around a pivot point and a deflection actuator operably connected to a controller and capable of rotating the deflection panel;
(c) detecting when crop material has formed a bale of predetermined size;
(d) wrapping and ejecting the bale while simultaneously allowing entry of crop material into the crop supply chamber by a control plate;
(e) detecting when the bale of crop material has been ejected from the bale chamber;
(f) ejecting crop material from the crop supply chamber by a control plate while continuing to collect new crop material by the pickup assembly;
(g) allowing entry of crop material from both the crop supply chamber and the pickup assembly into the bale chamber by the deflection system.

23. The method of claim 22, wherein the deflection system is capable of preventing or assisting entry of crop material into the bale chamber.

24. The method of claim 22, further comprising providing information to an operator via an operator interface about one or more of the following: position of the control plate in the crop supply chamber, position of the rear wall in the crop supply chamber, and direction of crop flow into or out of the crop supply chamber.

\* \* \* \* \*